(12) United States Patent
Hermes

(10) Patent No.: US 8,651,185 B2
(45) Date of Patent: Feb. 18, 2014

(54) REDUCING OR STOPPING THE UNCONTROLLED FLOW OF FLUID SUCH AS OIL FROM A WELL

(75) Inventor: Robert E. Hermes, White Rock, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 437 days.

(21) Appl. No.: 13/103,900

(22) Filed: May 9, 2011

(65) Prior Publication Data

US 2012/0285683 A1    Nov. 15, 2012

(51) Int. Cl.
| | |
|---|---|
| *E21B 33/06* | (2006.01) |
| *E21B 33/13* | (2006.01) |
| *E21B 43/12* | (2006.01) |
| *C09K 8/44* | (2006.01) |

(52) U.S. Cl.
USPC ........ 166/286; 166/75.13; 166/294; 166/295; 166/298; 166/300; 166/363; 166/368; 166/371; 507/224; 507/225; 507/273; 507/277

(58) Field of Classification Search
None
See application file for complete search history.

(56) References Cited

U.S. PATENT DOCUMENTS

| | | | | |
|---|---|---|---|---|
| 2,840,166 | A | * | 6/1958 | Eckel et al. ...................... 166/55 |
| 3,647,000 | A | * | 3/1972 | Rowley et al. ................ 166/285 |
| 3,926,256 | A | * | 12/1975 | McCall .......................... 166/285 |
| 4,182,823 | A | | 1/1980 | Schoenberg |
| 4,369,845 | A | * | 1/1983 | Henson et al. ................ 166/298 |
| 5,335,726 | A | * | 8/1994 | Rodrigues ..................... 166/295 |
| 5,358,051 | A | * | 10/1994 | Rodrigues ..................... 166/295 |
| 8,322,431 | B2 | * | 12/2012 | Ezell et al. .................... 166/344 |
| 2001/0032723 | A1 | * | 10/2001 | Chatterji et al. .............. 166/295 |
| 2007/0114033 | A1 | * | 5/2007 | Hermes et al. ................ 166/295 |
| 2007/0114034 | A1 | * | 5/2007 | Coates et al. ................. 166/295 |
| 2011/0056685 | A1 | * | 3/2011 | Ezell et al. .................... 166/277 |

* cited by examiner

*Primary Examiner* — George Suchfield
(74) *Attorney, Agent, or Firm* — Samuel L. Borkowsky

(57) ABSTRACT

The uncontrolled flow of fluid from an oil or gas well may be reduced or stopped by injecting a composition including 2-cyanoacrylate ester monomer into the fluid stream. Injection of the monomer results in a rapid, perhaps instantaneous, polymerization of the monomer within the flow stream of the fluid. This polymerization results in formation of a solid plug that reduces or stops the flow of additional fluid from the well.

24 Claims, 1 Drawing Sheet

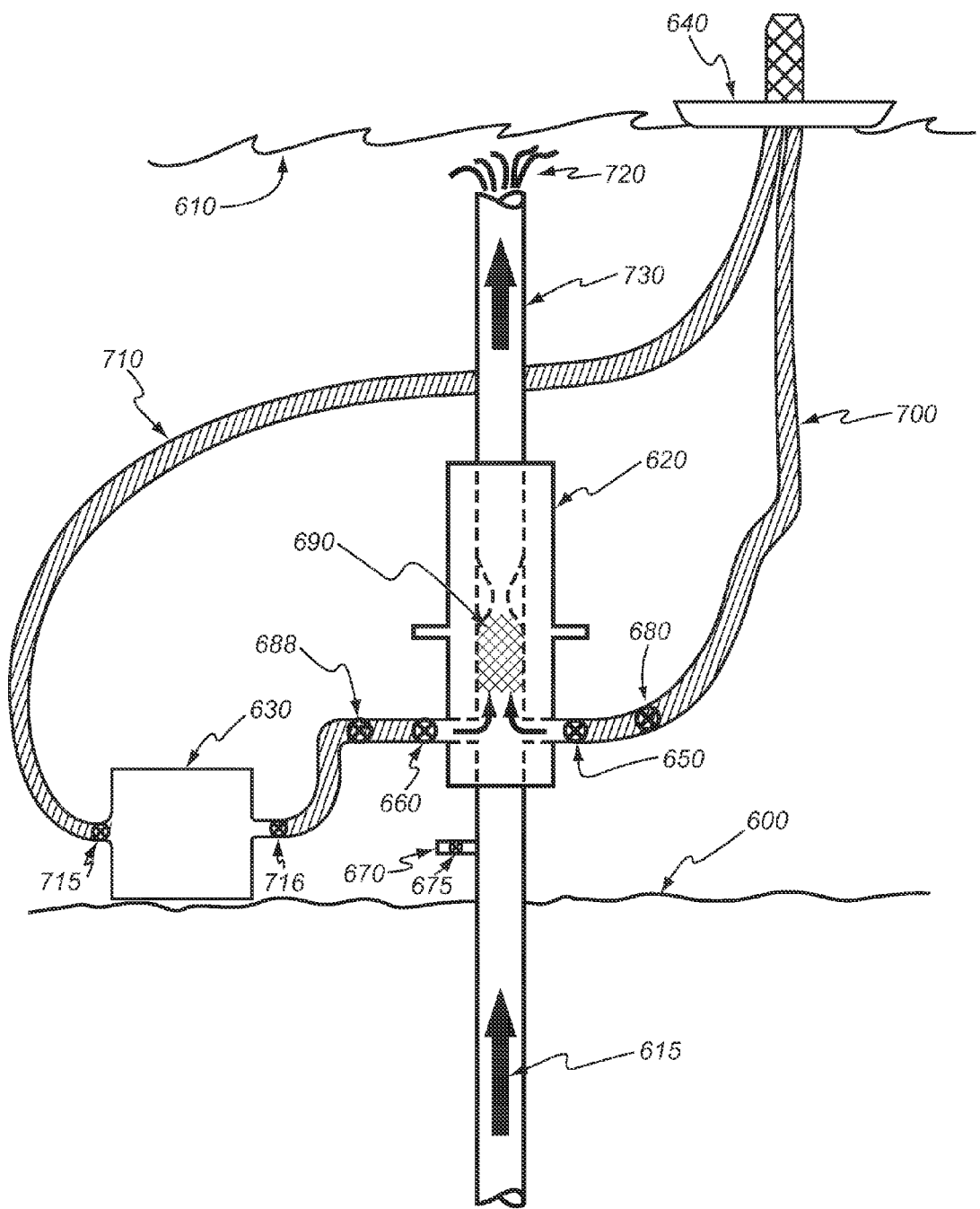

REDUCING OR STOPPING THE UNCONTROLLED FLOW OF FLUID SUCH AS OIL FROM A WELL

STATEMENT REGARDING FEDERAL RIGHTS

This invention was made with government support under Contract No. DE-AC52-06NA25396 awarded by the U.S. Department of Energy to Los Alamos National Security, LLC, for the operation of Los Alamos National Laboratory. The government has certain rights in the invention.

FIELD OF THE INVENTION

The present invention relates generally to reducing or stopping the uncontrolled flow of fluid such as oil and gas from a well.

BACKGROUND OF THE INVENTION

In a typical oil or gas well, a blowout preventer ("BOP") controls the flow of fluids both into and out of the well during the drilling process. Although blowout preventers come in a variety of styles, sizes and pressure ratings, they generally have several different valve systems. Some valve(s) may be able to completely close the wellbore, others may seal around the tubular components of the well, and yet others are fitted with shearing surfaces that can cut through drill pipe to effect a complete seal. A situation may occur during drilling in which the crew loses pressure control of the well. This situation is known in the art as a "kick". When a kick happens, and the BOP fails, fluids such as gas, oil, and/or water rush up to the surface. This sudden rush may cause a blowout, which could lead to catastrophic damage, explosion, fire, and loss of life. When a BOP fails, and it is determined that the BOP cannot be closed properly by some alternate means (e.g., by using remotely operated vehicles), then oil/gas/water would continue to flow from pipes that are connected to the BOP.

Both land-based and underwater-based wells employ BOPs. The failure of the BOP can occur on land or in an underwater environment such as in a lake or in the sea or ocean. A BOP can fail, for example, during a deep sea drilling operation. BOPs for deep sea drilling operations are connected to various pipes in an assembly that is known in the art as a "riser" assembly. One such pipe is known in the art as the "choke line". Another such pipe is known in the art as the "kill line". These pipes may be located at the bottom end of the BOP stack, or in some designs, may be located near the top of the BOP stack. These pipes are also connected to a drilling rig. The drilling rig for a deep sea operation may be a platform, a semi-submersible ship, or a drill ship located above the well on the water surface. Therefore, the riser, choke line and kill lines may be from a few feet to several thousand feet long, depending upon the distance from the drilling rig to the BOP stack held on the ocean floor.

After a BOP fails, there are ways to stop the uncontrolled flow of fluid such as oil and gas from the well. One of these ways is known in the art as a "top kill". A "top kill" is sometimes used in combination with a "junk shot". Another way to reduce or stop the uncontrolled flow of oil from a well after a BOP fails is called a "static kill".

Another way for reducing or stopping the uncontrolled flow of liquids from an oil well after failure of a BOP is to drill a second hole that intercepts the uncontrolled oil well above a zone where the oil/gas/water is located, and afterward, to close the well by cementation. This method of stopping uncontrolled release of fluid from the well is sometimes referred to in the art as a "bottom kill".

Each of the above methods for reducing or stopping the flow of oil from a well after a BOP fails has its limitations. Any of them might fail in a deep sea environment. In the recent 2010 disaster in the Gulf of Mexico, for example, a deep sea oil well experienced a kick and the BOP for the well failed. The result was that oil/gas/water flowed uncontrollably from the well into the Gulf of Mexico. The drilling rig for the well was a semi-submersible drill ship. The initial kick to the drilling rig resulted in an explosion, fires on the drilling rig, and loss of life. Later, the drilling rig sank into the Gulf of Mexico and the riser assembly snapped, which resulted in an uncontrolled release of oil/gas/water from the undersea well into the Gulf of Mexico. This uncontrolled flow from the undersea well continued for several weeks.

Various methods were attempted to stop or stem the flow. A "top kill" method was attempted to provide enough back pressure to stem the flow of oil. Heavy drilling mud was pumped into the blowout preventer "choke line" and "kill line" and down into the oil well.

A "junk shot" was attempted in combination with the "top kill" wherein junk material (pieces of rubber, golf balls, short lengths of rope, etc.) were included with the drilling mud to try to plug the orifices within the BOP.

Neither of the above attempts were effective.

The uncontrolled flow was finally stopped after the operators performed a "bottom kill" method that involved drilling a secondary hole into the original well and subsequently creating a cement plug in the original well.

Better methods for reducing or stopping the uncontrolled flow of fluids such as oil and gas from wells are needed to minimize the damage caused by these potential disasters.

Therefore, an object of the present invention is a method for reducing or stopping the flow of fluids such as oil and gas from an oil well after a blowout preventer fails.

SUMMARY OF THE INVENTION

To achieve the foregoing and other objects, and in accordance with the purposes of the present invention, as embodied and broadly described herein, the present invention provides a method for reducing or stopping the uncontrolled flow of fluids such as oil and gas from a well. The method involves pumping a composition comprising a 2-cyanoacrylate ester monomer into the flow stream from the well. The monomer polymerizes in the flow stream to form a plug. The plug reduces or stops the uncontrolled flow of fluids from the well.

BRIEF DESCRIPTION OF THE DRAWING

FIG. 1 shows a sketch of an embodiment for reducing or stopping the flow of fluid from a deep sea oil well.

DETAILED DESCRIPTION

The invention relates to reducing or stopping an uncontrolled flow of fluids such as oil or gas from a well. An embodiment involves injecting a composition including 2-cyanoacrylate ester monomer into the fluid stream. Injection of the monomer results in a rapid, perhaps instantaneous, polymerization of the monomer within the flow stream of the fluid. This polymerization results in formation of a solid plug that reduces or stops flow of additional fluid from the well. Premature polymerization of the monomer can be avoided or minimized by adding a polymerization inhibitor to the composition before pumping it into the fluid stream.

Before describing details of the method as it applies to reducing or stopping the uncontrolled flow of fluid from a well, the examples below demonstrate the polymerization of 2-cyanoacrylate ester monomer and formation of polymer plugs after contact with samples of crude oil.

Example 1

A vial with dimensions of 2.5 centimeters in diameter by 6 centimeters in height was used as a mixing vessel at a temperature of 22.4° C. Approximately 3 grams of Maya crude oil containing approximately 5% water was added to the vial. The crude oil had a viscosity which was low enough for the oil to easily flow when the vial was tilted. Approximately 2.0 grams of ethyl 2-cyanoacrylate monomer was added dropwise into the center of the oil in the vial. Polymerization of the monomer was instantaneous, with significant heat generated. The temperature was measured using a thermocouple probe. The temperature rose to a peak in about 2 minutes to 56.6° C. The combined solid/oily material was very hard. The plug that formed in the vial included poly(ethyl 2-cyanoacrylate) and the crude oil. Apparently, impurities (such as sulfur compounds) in the crude oil did not inhibit the polymerization of the ethyl 2-cyanoacrylate. The water in the oil initiated the polymerization of the ethyl 2-cyanoacrylate to such a significant degree that the vial could be completely inverted with only a slight dripping of the oil from the combined mixture.

Example 2

A vial with dimensions of 2.5 centimeters in diameter by 6 centimeters in height was used as a mixing vessel at 22.4° C. Approximately 3.0 grams of FCC crude oil (a standardized crude oil sample) was added to the vial. The crude oil had a viscosity that was low enough for the oil to easily flow when the vial was tilted. Approximately 1.6 grams of ethyl 2-cyanoacrylate monomer was added dropwise into the center of the oil and stirred with a stainless steel thermocouple probe. The polymerization was instantaneous, with significant heat generated. The temperature was measured with the thermocouple probe. The peak temperature of 70.8° C. was reached within three minutes of adding the ethyl 2-cyanoacrylate. The combined solid/oily material was very hard. The plug that formed in the vial included poly(ethyl 2-cyanoacrylate) and the crude oil. Apparently, impurities (such as sulfur compounds) in the crude oil did not inhibit the polymerization of the ethyl 2-cyanoacrylate. The water in the oil initiated the polymerization of the ethyl 2-cyanoacrylate to such a significant degree that the entire volume of liquid in the vial solidified, probably due to better mixing than in Example 1. When the vial was inverted, there was no observed downward flow of oil from the mass.

Having demonstrated above by way of example the instantaneous polymerization of the monomer and subsequent formation of a solid polymer plug from 2-cyanoacrylate ester monomer in the presence of various oil samples, it is expected that the use of compositions including 2-cyanoacrylate monomer(s) will be effective for reducing or stopping the uncontrolled flow of fluids such as oil and gas from well such as a deep sea oil well.

Thus, an embodiment of this invention relates to a method for reducing or stopping the flow of fluids such as oil and gas from a deep sea oil well. Deep sea wells include a blowout preventer ("BOP") for controlling the flow of fluids to and from the well. The blowout preventer stack may be forty to fifty feet tall for a deep sea oil well, and may be ten to twenty feet off the ocean floor. The BOP typically is supported by multiple concentric well casings as well as cable ties to the ocean floor. The BOP includes high pressure pipe connections and valves called choke lines and kill lines, as well as valve mechanisms that close the well during an emergency. These choke and kill lines may be accessed in the event of a failed BOP. The choke and kill lines may be attached to the BOP, and may be located either above or below the BOP emergency valves mechanisms.

In an embodiment of the present invention useful for reducing or stopping the uncontrolled flow of fluid such as oil or gas from a deep sea well, a valve and manifold assembly containing an appropriate amount of the 2-cyanoacrylate ester monomer would be connected to the choke and kill lines, in series with tubing connected to pumps located on an emergency drill ship. The drill ship is capable of pumping heavy drilling fluid into the manifold, and into the choke and kill lines of the BOP stack. This is similar to the known mechanical assemblies used for the "top kill" and/or "junk shot" methods. When the manifold valves are actuated, the composition including 2-cyanoacrylate ester monomer in the manifold would be delivered through the choke and/or kill lines and into the uncontrolled flow of fluids such as oil and gas. An assembly near the BOP may include high pressure one-way check valve(s) to prevent back flush into the lines containing the 2-cyanoacrylate ester monomer. Water is generally present in fluid flowing from the well. This water from the crude oil and/or natural gas present in the uncontrolled flow of fluid would initiate the polymerization of the 2-cyanoacrylate ester monomer present in the composition that is pumped into the uncontrolled fluid stream. This polymerization would occur rapidly, perhaps instantaneously, within the stream. This rapid polymerization of 2-cyanoacrylate ester monomer would result in a solid plug including polymer formed from polymerization of the 2-cyanoacrylate ester monomer. The plug would also include oil from the flow stream. This solid plug would clog the orifices in the BOP and/or orifices in the riser assembly atop the BOP. Clogging the orifices in the BOP and/or riser assembly would result in reducing or stopping the uncontrolled flow of fluid such as oil or gas from the well.

The composition that includes the 2-cyanoacrylate ester monomer that is useful for reducing or stopping the uncontrolled flow of fluid such as oil or gas from the well may include other additives. Some of these additives can help form the plug. In the terminology of the well drilling art, this method is a "top kill" method that may be used in combination with a "junk shot".

In an embodiment, a method is provided for reducing or stopping the uncontrolled flow of fluid such as oil or gas wherein a composition is used to reduce or stop the flow that includes 2-cyanoacrylate ester monomer along with other materials that would help form a plug in the flow stream of fluid such as oil or gas. Additives such as hydrofracking sand, ceramics, shredded tires, chopped fibers, wires, chopped rope, golf balls, and the like, could be included in the composition with the 2-cyanoacrylate ester monomer in order to help form a plug.

If the choke and/or kill lines are not operational for accepting the composition containing the 2-cyanoacrylate ester monomer, an alternative embodiment may be used to provide access below the BOP. In an alternative embodiment, a commercially available remotely operated annular drilling tool ("ADT") that is capable of drilling a port into the casing(s) below the BOP may be used. This embodiment may result in gaining access to one or all of the annuli, including the innermost tie-back production tubing, if necessary.

In an embodiment, an ADT capable of forming a port into the casing(s) would be used to provide a port to access the production tubing just below the blowout preventer and above the ocean floor. Once drilled, tubing may be connected to the newly formed port in the side of the casing(s), leading to a valve and manifold assembly containing a composition including an appropriate amount of a 2-cyanoacrylate ester monomer in series with tubing connected to pumps located on an emergency drill ship that is capable of pumping heavy drilling fluid into the manifold. The mechanical assembly near the BOP stack may include high pressure one-way check valve(s) to prevent back flush of fluid from the well into the lines containing the monomer. Water present in an uncontrolled flow stream of crude oil or natural gas would initiate the rapid polymerization of the 2-cyanoacrylate ester monomer within the flow stream, providing a polymer-containing plug that would clog the orifices in the BOP and/or the riser assembly above the BOP, thus reducing or stopping the uncontrolled flow of oil or fluids from the well. This "top kill" method could be modified by adding a "junk shot" to the composition containing the 2-cyanoacrylate ester monomer.

In the unlikely event that a suitable amount of water is not present in the uncontrolled flow of fluid from the oil well, a suitable initiator may be used to initiate the polymerization in the fluid stream. There are anionic polymerization initiators known in the art that are capable of initiating the polymerization of the 2-cyanoacrylate ester monomer. These initiators include, but are not limited to, organic and inorganic salts such as sodium acetate, sodium butyl cyanoacetate, lithium bromide, potassium hydroxide, potassium cyanide, sodium iodide, and tetrabutylammonium iodide. In addition, Lewis bases such as phosphines, aliphatic amines, and aromatic amines may also be used to initiate the polymerization. Water can also be added to initiate the polymerization.

A composition containing the initiator would be introduced concurrently with the composition containing the 2-cyanoacrylate ester monomer. The initiator-containing composition and monomer-containing composition could be introduced into the stream using concentric tubing of an inner narrower tube and a wider outer tube. In an embodiment, the initiator-containing composition could flow through the inner tube, and the monomer-containing composition could flow through the annulus formed in between the inner tube and the outer tube. In another embodiment, the composition with the monomer could be present in the inner tube and the composition with initiator could be present in the annulus. The initiator could be introduced into the uncontrolled fluid stream below the entry point of the monomer (e.g., through the port made by an ADT). In an embodiment, the initiator would be introduced below the entry point for the monomer.

An embodiment for implementing a method for reducing or stopping the uncontrolled flow of fluid such as oil or gas into the sea from a deep seal drilling operation is shown schematically in FIG. 1. In this embodiment, an emergency drill ship 640 is located on the surface 610 above a deep sea well drilled into the sea floor 600. A blowout preventer 620 for controlling the flow of fluid to and from the well is located above the sea floor 600. As FIG. 1 shows, the blowout preventer 620 has failed. Fluid 720 is escaping from riser assembly 730, shown simply in FIG. 1 as a tube. The fluid 720 is flowing uncontrollably into the sea. Therefore, an embodiment of the method of the invention is being implemented to reduce or stop this uncontrolled flow of oil and gas from the well into the sea. A composition including 2-cyanoacrylate ester monomer will be pumped from the emergency drill ship 640 into the flow stream that is flowing from underground and into failed blowout preventer 620 to form a plug in the blowout preventer and/or riser assembly to stop the uncontrolled flow of fluid.

In the embodiment shown, pipes 700 and 710 provide conduits for pumping materials from emergency drill ship 640 into the flow stream toward the failed blowout preventer 620. Materials including a composition containing 2-cyanoacrylate monomer ester, a composition including an initiator, and heavy drilling fluid, may be pumped through pipes 700 and 710.

In the embodiment shown, pipe 700 is connected to one-way valve 680, which is connected to valve 650. When valve 680 and valve 650 are both open, fluid may flow from emergency drill ship 640 into the flow stream toward the blowout preventer 620. Pipe 710 is connected to valve 715, which is attached to manifold 630, which is connected to valve 716. When valve 715 is open, fluid such as a composition containing 2-cyanoacrylate monomer ester, a composition including an initiator for initiating polymerization of the monomer, and a heavy drilling fluid may enter manifold 630. This "pill" may then be flushed into the lines containing valves 688 and 660 and into the flow stream toward the blowout preventer 620, and will be polymerized rapidly in the flow stream to form a plug 690 which will reduce or stop further oil/gas/water from escaping into the sea.

In an embodiment operation, a composition containing 2-cyanoacrylate ester monomer is placed into manifold 630 prior to placement near the well. Connections are made with pipe 710 at valve 715 leading into the manifold 630, and valve 716 exiting the manifold 630 is connected to the remaining pipe having one-way valve 688 and valve 660 at the entrance to the BOP. After opening valves 715, 716 and 660, the heavy drilling fluid being pumped from drill ship 640 pushes the "pill" of 2-cyanoacrylate ester monomer through one-way check valve 688. The "pill" of 2-cyanoacrylate ester monomer will be forced through valve 660 and then into the uncontrolled flow stream 615 of oil/gas/water, and will be polymerized rapidly in the flow stream to form a plug 690 which will reduce or stop further oil/gas/water from escaping into the sea.

In another embodiment, an annular drilling tool (ADT) drills a port just below the blowout preventer; the line that exits manifold 630 in FIG. 1 would be connected to the port at a position identified in FIG. 1 by callout 670, containing valve 675. Once valve 716 and valve 675 are opened, the "pill" of 2-cyanoacrylate ester monomer will be forced through valve 675 and then into the uncontrolled flow stream 615 of oil/gas/water, and will be polymerized rapidly in the flow stream to form a plug 690 which will reduce or stop further oil/gas/water from escaping into the sea.

In an embodiment for a land-based or lake-based well, the ground or lake bottom would serve as the surface to which the blowout preventer 620 is attached as well as providing a surface for the manifold 630 to rest upon.

In an embodiment wherein a composition including 2-cyanoacrylate is used in combination with an initiator, an initiator composition is used. Pipe 700 may contain the initiator composition while pipe 710 contains the monomer composition. The entrance for the initiator into the flow stream may lie below the entrance for the monomer composition.

In an embodiment, both pipes 700 and 710 may be connected through a valve or valves attached to the manifold 630.

It should be understood that any effective way to introduce a composition into the uncontrolled fluid stream of a well to initiate the polymerization of the 2-cyanoacrylate ester monomer that results in a plug that reduces or stops the uncontrolled flow of fluid such as oil or gas from the well is within the scope of this invention.

An inhibitor or stabilizer may be used to prevent premature polymerization or solidification of the 2-cyanoacrylate ester monomer during transport to the site of implementation or while filling the manifold as described above. Inhibitors useful for this purpose are described, for example, by Shoenberg in U.S. Pat. No. 4,182,823 entitled "Anionic Polymerization Inhibitor for Cyanoacrylate Adhesives", which is hereby incorporated by reference. According to Shoenberg, the combination of an acid chelate formed from boric acid or a derivative thereof with a selected polyhydroxy compound, does not adversely affect the cure rate of cyanoacrylates. Compounds that provide the boron in the chelate are ortho-boric acids (commonly known as boric acid) or borate ester derivatives such as alkyl borates, which can be mono-, di-, or trisubstituted, with examples such as boric oxide and trialkyl borates, respectively. Polyhydroxy compounds used in the chelate may be chosen from a large variety of such compounds, with the preferred examples pyrogallol, catechol, salicyclic acid, tartaric acid, and oxalic acid. The chelate may be used in a concentration range of 10-1000 ppm of the total composition to provide effective stabilization without adversely affecting the rate of polymerization or solidification upon initiation with the initiators described above.

Monomers of 2-cyanoacrylate ester useful with this invention may be chosen for their characteristics depending on their functionality and rate of cure. These monomers are esters of 2-cyanoacrylic acid. 2-cyanoacrylate ester monomers useful with this invention include those having the following general formula:

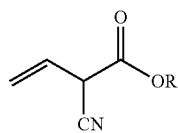

wherein R is an alkyl group having 1 to 10 carbon atoms, an alkenyl group having 2-10 carbons, a cyclohexyl group, or a phenyl group. For example, methyl 2-cyanoacrylate, ethyl 2-cyanoacrylate, propyl 2-cyanoacrylate, butyl 2-cyanoacrylate, octyl 2-cyanoacrylate, cyclohexyl 2-cyanoacrylate, or phenyl 2-cyanoacrylate may be used. In addition, combinations of these monomers, and other cyanoacrylate monomers, may be used.

The use of any particular 2-cyanoacrylate ester monomer would depend upon the conditions of pressure and heat expected at the injection point at or below the BOP located on the oil or gas well, and the immediate availability of said monomer. For example, methyl 2-cyanoacrylate could be chosen because of its boiling point of 151° F., and fast rate of polymerization in a blowout situation where the temperature of the oil or gas coming from the well would be at or below this boiling point. However, it is further understood that the pressures encountered in the "top kill" system would also be matching or exceeding the pressure expected in the well (approximately 6,000 psig or more). In this case, the methyl 2-cyanoacrylate would then have an elevated boiling point, so well temperatures above the normal boiling point could be treated using this monomer. In addition, ethyl 2-cyanoacrylate could be chosen for its even higher boiling point of 365° F., and the fact that it is more readily available in large quantities. Other 2-cyanoacrylate esters could be chosen because of their higher boiling points or the physical properties of the resulting polymer.

In an embodiment, a pre-gelled 2-cyanoacrylate ester could be used. A pre-gelled cyanoacrylate is a semi-solid form of cyanoacrylate that can be pumped within a water-free, organic fluid so that the pre-gelled cyanoacrylate could flow more easily through the manifold. Typical organic fluids useful for this purpose include those known in the art of oil and gas drilling, and they include but are not limited to, mineral oil, kerosene, diesel oil, internal olefins, and the like Inhibitors and/or initiators may also be used, if needed, to prevent premature polymerization of the pre-gelled cyanoacrylate. In an embodiment, a "junk shot" in the form of particles such as hydrofracking sand, ceramics, shredded tires, chopped fibers, wires, chopped rope, chopped golf balls, and the like, might be added to the pre-gelled cyanoacrylate in order to help form a plug and clog orifices in a blowout preventer ("BOP").

In another embodiment, a method is provided to reduce or stop the uncontrolled flow of fluid such as oil or gas from a land or lake based oil or gas well due to the failure of a blowout preventer. The method, like the method for doing the same in a deep sea environment, also involves pumping a composition including a 2-cyanoacrylate ester monomer into the flow stream, whereby a plug is formed that reduces or stops the uncontrolled flow of fluid such as oil or gas from the well.

Although the present invention has been described with reference to specific details, it is not intended that such details should be regarded as limitations upon the scope of the invention, except as and to the extent that they are included in the accompanying claims.

What is claimed is:

1. A method for reducing or stopping an uncontrolled flow of fluid from a well having a failed blowout preventer, comprising:
    pumping a composition comprising a 2-cyanoacrylate ester monomer into a flow stream of fluid from a well, whereby the monomer polymerizes to form a plug that reduces or stops the uncontrolled flow of fluid from the well.

2. The method of claim 1 wherein the composition comprising 2-cyanoacrylate ester monomer is pumped into a flow stream in the blowout preventer.

3. The method of claim 1, wherein the composition of 2-cyanoacrylate is pumped through a port formed by drilling through an annulus, the port formed below the blowout preventer.

4. The method of claim 1, wherein the fluid comprises oil.

5. The method of claim 1, wherein the fluid comprises natural gas.

6. The method of claim 1, wherein the 2-cyanoacrylate ester monomer is of the formula

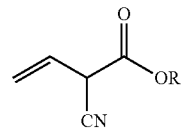

wherein R is selected from an alkyl group having 1 to 10 carbon atoms, an alkenyl group having 2-10 carbons, and a cyclohexyl group, or a phenyl group.

7. The method of claim 6, wherein the 2-cyanoacrylate ester monomer is selected from methyl 2-cyanoacrylate, ethyl 2-cyanoacrylate, propyl 2-cyanoacrylate, butyl 2-cyanoacrylate, and octyl 2-cyanoacrylate, cyclohexyl 2-cyanoacrylate, and phenyl 2-cyanoacrylate.

8. The method of claim 1, wherein the composition comprises a pre-gelled cyanoacrylate.

9. The method of claim 1, wherein the composition further comprises an additive for aiding in the formation of the plug.

10. The method of claim 9, wherein the additive comprises a ceramic material.

11. The method of claim 9, wherein the additive comprises a fiber.

12. The method of claim 9, wherein the additive comprises particles of a solid.

13. The method of claim 12, wherein the particles of a solid comprise a polymer.

14. The method of claim 9, wherein the additive comprises sand.

15. The method of claim 1, wherein the composition further comprises a polymerization inhibitor.

16. The method of claim 15, wherein the composition of the inhibitor includes an acid chelate formed from boric acid or a derivative thereof with a selected polyhydroxy compound.

17. The method of claim 16 wherein the polyhydroxy compound comprises pyrogallol.

18. The method of claim 1, further comprising pumping an initiator composition into the flow stream below the monomer composition.

19. The method of claim 18 where the initiator composition is comprised of an anionic initiator.

20. The method of claim 19 where the anionic initiator is selected from water, sodium acetate, sodium butyl cyanoacetate, lithium bromide, potassium hydroxide, potassium cyanide, sodium iodide, tetrabutylammonium iodide, a phosphines, an aliphatic amine, an aromatic amine, and mixtures thereof.

21. The method of claim 1 where the composition comprising a 2-cyanoacrylate ester monomer is pre-loaded into a valved manifold that is placed near the point of delivery to the blowout preventer of a well.

22. The method of claim 1 where the 2-cyanoacrylate ester monomer is pre-loaded into a valved tank that is placed on the drilling rig, or placed near the point of delivery to the blowout preventer of a well.

23. The method of claim 18 where the initiator is pre-loaded into a valved manifold that is placed near the point of delivery to the blowout preventer of a well.

24. The method of claim 18 where the initiator is pre-loaded into a valved tank that is placed on the drilling rig, or placed near the point of delivery to the blowout preventer of a well.

* * * * *